March 27, 1928.
G. A. JOHNSON
SURGICAL INSTRUMENT
Filed Feb. 7, 1927
1,663,761
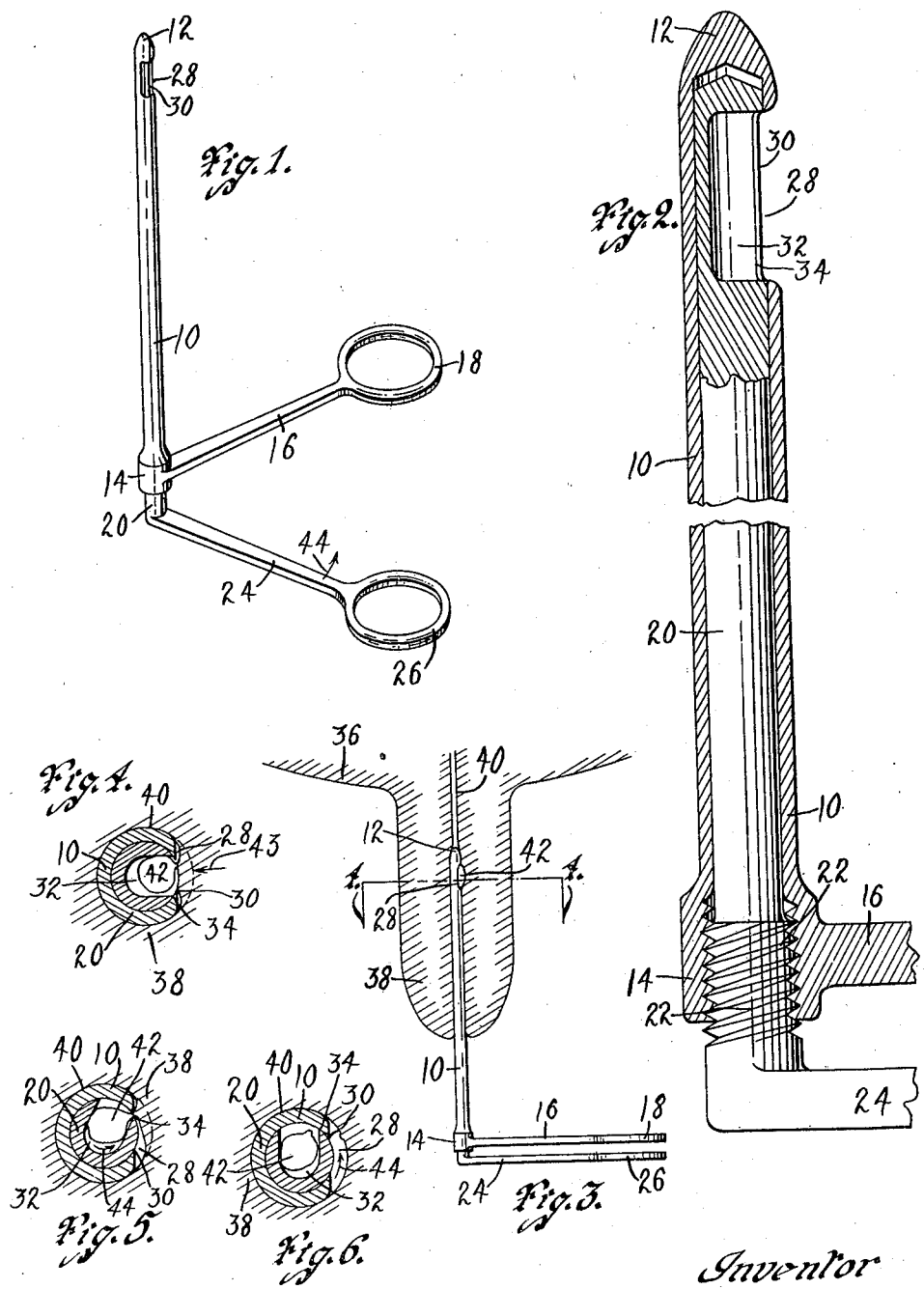

Patented Mar. 27, 1928.

1,663,761

UNITED STATES PATENT OFFICE.

GEORGE A. JOHNSON, OF POMEROY, IOWA.

SURGICAL INSTRUMENT.

Application filed February 7, 1927. Serial No. 166,488.

The object of my invention is to provide a surgical instrument especially adapted for removing tumors and being of simple, durable and comparatively inexpensive construction.

A further object of my invention is to provide such an instrument with means for receiving an object and means for severing and withdrawing it.

Still a further object is to provide such an instrument especially adapted for the removal of tumors from the milk ducts of the teats of an animal.

Still a further object is to provide a convenient means for operating the device for cutting the tumor from the inside wall of the milk duct and then withdrawing it.

More particularly it is my object to provide a surgical instrument of this character in the form of a tube to be inserted in the milk duct and a shaft having a pocket and being rotatably mounted within the tube, there being cutting coacting edges on the tube and the shaft adjacent the pocket whereby the tumor may be cut.

Still a further object is to provide the parts of such an instrument arranged to be easily assembled and disassembled for cleaning purposes, said arrangement also providing for a diagonal stroke of one of the severing edges relative to the other for more effectively cutting the tumor.

With these and other objects in view, my invention consists in the construction, arrangement and combination of the various parts of my surgical instrument, whereby the objects contemplated are attained, as hereinafter more fully set forth, pointed out in my claims and illustrated in the accompanying drawings, in which:

Figure 1 is a perspective view of my improved operating instrument.

Figure 2 is a vertical sectional view of the same.

Figure 3 is a side elevation of the device, showing it inserted in the milk duct of the teat of an animal and in position to receive the tumor growth within the duct.

Figure 4, is an enlarged cross sectional view taken on the line 4—4 of Figure 3, illustrating the tumor growth received in the instrument preparatory to cutting it loose from the inside wall of the milk duct.

Figure 5 is a similar sectional view showing the tumor being cut loose from the wall of the duct, and Figure 6 illustrates the tumor cut loose and received within the pocket of the operating instrument preparatory to removing the instrument from the duct.

On the accompanying drawings I have used the reference numeral 10 to indicate the tubular casing of my improved operating instrument. The casing 10 is pointed and rounded at its upper end as indicated at 12. The lower end of the casing 10 is enlarged as indicated at 14 and internally screw threaded.

Extending from the enlarged portion 14 of the casing 10 is an arm 16 terminating in a finger engaging loop 18.

Rotatably received within the casing 10 is a shaft 20 having an enlarged screw threaded portion 22 at its lower end. The enlarged portion 22 extends downwardly and then outwardly in the form of an arm 24 which terminates in a finger engaging loop 26.

From the construction of the parts thus far described, it will be readily seen that the shaft 20 can be assembled within the casing 10 by rotation thereof, the threads on the enlarged portion 22 coacting with the internally screw threaded portion 14 of the casing 10.

Adjacent the pointed and rounded end 12 of the casing 10 I provide a notch 28 which is elongated longitudinally of the casing 10. The manner of cutting the notch 28 provides a sharpened edge 30 terminating at the inside wall of the casing 10. This construction is best disclosed in Figure 4 of the drawings.

Adjacent the upper end of the shaft 20 I provide a pocket 32 having an open side terminating at the outside of the shaft 20 whereby a sharpened edge 34 is formed. From the construction of the parts just described, it will be seen that the coacting sharpened edges 30 and 34 form a shear when the shaft 20 is rotated relative to the casing 10 to a predetermined position.

*Practical operation.*

For the purpose of illustrating my operating instrument in use, I have illustrated in Figure 3 the udder 36 of an animal such as a cow for instance. A teat 38 is illustrated depending from the udder 36. A milk duct 40 is illustrated having a tumor growth 42 therein. It may be here mentioned that these tumors may be felt if the animal's teat is pressed with the fingers. The tumor feels like a piece of gristle.

The pointed end 12 of the instrument is inserted in the duct 40 and pushed upwardly until the notch 28 registers with the tumor 42. The operator then manipulates the teat 38, squeezing it adjacent the tumor 42 and forcing the tumor into the pocket 32. This operation can easily be performed as the operator can feel with his fingers when the tumor has entered the pocket 32.

The operation of forcing the tumor into the pocket is illustrated in Figure 4 of the drawings, the arrow 43 indicating the direction of pushing the surface of the teat to force the tumor into the pocket.

The shaft 20 is then rotated in the direction indicated by the arrow 44, the finger still being held against the teat to prevent the tumor from coming out of the pocket 32. As the shaft 20 is rotated, the sharpened edge 34 of the pocket 32 approaches the sharpened edge 30 of the notch 28 until in the position as illustrated in Figure 5, only the portion of the tumor connecting it to the inside wall of the milk duct is between the sharpened edges 30 and 34.

It is obvious that further rotation of the shaft 20 in the direction of the arrow 44 will sever the tumor from the wall of the duct and the tumor itself will be received within the pocket 32. It may here be mentioned that rotation of the shaft 20 is accomplished by moving the loop 26 toward the loop 18 by inserting a finger and thumb into the loops.

Figure 6 of the drawings illustrates the shaft 20 rotated until the sharpened edge 34 has passed the sharpened edge 30 which closes the opening formed by the notch 28 in the casing 10 and in which position the tumor 42 is completely severed from the wall of the duct 40 and received within the pocket 32. The operating instrument may now be withdrawn from the milk duct 40 and the tumor discharged from the pocket 32 by moving the loop 26 away from the loop 18 for again opening the pocket 32 and the notch 28.

By using a threaded connection between the casing 10 and the shaft 20 a slightly longitudinal movement is imparted to the shaft 20 relative to the casing 10 when the shaft is rotated within the casing. This imparts a diagonal movement of the sharpened edge 34 relative to the sharpened edge 30 which is desirable in severing the tumor from the wall of the duct.

It will, of course, be understood that besides using my device for the removal of tumors from the teats of animals, it can also be used for removing other growths within ducts of any character where it is possible to force the growth into the pocket 32 so that it may be severed from the inside wall of the duct.

Considerable modifications in the structural details of the device or the substitution of mechanical equivalents could be employed for accomplishing the same result and it is my intention to cover by my claims any forms of such deviations of such construction which might reasonably be included within their scope.

I claim as my invention:

1. An instrument for shearing and receiving objects comprising a tube, a shaft therein, a notch cut in said tube, the bottom of said notch extending less than half way through the tube whereby cutting edges having an acute angle are formed, a pocket in said shaft adjacent said notch whereby movement of said shaft relative to said tube will cause a shearing action between said pocket and said notch.

2. A device of the class described comprising a tubular casing, a lever thereon, a notch in said casing having sharpened edges, a shaft in said casing, a pocket in said shaft, the sides of said pocket being tangential to the circumference of said shaft at the edges of said pocket whereby cutting edges are formed.

3. A device of the class described comprising a tubular casing, a lever thereon, a notch in said casing having sharpened edges, a shaft in said casing and in screw threaded engagement therewith, a lever on said shaft, movement of one of said levers relative to the other one imparting rotation and longitudinal movement of the shaft relative to the casing, a pocket in said shaft having sharpened edges whereby a diagonal shearing action occurs between the edges of said notch in said casing and the edges of said pocket when the levers are moved.

4. An instrument for shearing and receiving objects comprising a tube, a shaft therein, a notch in said tube, the bottom of said notch extending less than half way through the tube whereby acute angle cutting edges are formed, a pocket in said shaft, the sides of said pocket being tangential to the circumference of said shaft at the edges of said pocket whereby cutting edges are formed whereby rotation of said shaft relative to said tube causes a shearing action between the edges of said notch and the edges of said pocket.

5. In an instrument of the character described, a tube, a shaft therein, coacting shear edges formed on said tube and said shaft, a screw threaded connection between said tube and said shaft, handle means on said tube and said shaft for rotating one relative to the other whereby a diagonal shearing action between said shear edges occurs upon such rotation.

Des Moines, Iowa, January 24, 1927.

GEORGE A. JOHNSON.